United States Patent
Ma

(10) Patent No.: US 6,904,936 B2
(45) Date of Patent: Jun. 14, 2005

(54) FLOW-DIVERTING ROTARY VALVES OF MULTIPLE PATHS

(75) Inventor: Qi-Feng Ma, Rancho Palos Verdes, CA (US)

(73) Assignee: Archidex, Torrance, CA (US)

( * ) Notice: Subject to any disclaimer, the term of this patent is extended or adjusted under 35 U.S.C. 154(b) by 173 days.

(21) Appl. No.: 10/411,181

(22) Filed: Apr. 10, 2003

(65) Prior Publication Data

US 2003/0196713 A1 Oct. 23, 2003

Related U.S. Application Data

(60) Provisional application No. 60/374,237, filed on Apr. 19, 2002.

(51) Int. Cl.$^7$ .............................................. F16K 11/06
(52) U.S. Cl. .............................. 137/625.47; 137/625.11
(58) Field of Search ....................... 137/625.11, 625.47, 137/597

(56) References Cited

U.S. PATENT DOCUMENTS

| | | | |
|---|---|---|---|
| 2,985,589 A | | 5/1961 | Broughton et al. |
| 3,192,954 A | * | 7/1965 | Gerhold ................. 137/625.11 |
| 3,706,812 A | | 12/1972 | Rosset et al. |
| 3,814,129 A | * | 6/1974 | Cioffi ..................... 137/625.11 |
| 4,068,528 A | | 1/1978 | Gundelfinger et al. |
| 4,263,937 A | * | 4/1981 | Rudenko .................... 601/136 |
| 5,105,851 A | * | 4/1992 | Fogelman .............. 137/625.11 |

OTHER PUBLICATIONS

Valco Instruments Co. Inc. Catolog. 1995 p. 170–180 (Copies Attached).

* cited by examiner

Primary Examiner—John Fox

(57) ABSTRACT

The present invention describes a rotary valve for simultaneously diverting a plurality of liquid streams among a plurality of liquid receivers in a sequential and cyclic manner. Said rotary valve comprises: (1) a stator of barrel shape having a circular cavity, a bottom, a lateral structure, a group of first ports being spaced longitudinally along the lateral structure, and a group of second ports being evenly spaced apart on the bottom around the axis of the stator at the same distance from said axis, the number of the second ports being n multiple of that of the first ports wherein n is an integer of 1 or larger; (2) a rotor constructed by a hollow shaft section and a core section within said hollow shaft section, said hollow shaft section having a lateral structure accommodating a plurality of top openings that are longitudinally spaced apart and a bottom end accommodating a plurality of bottom openings that are evenly spaced apart around the axis of the hollow shaft at the same distance from said axis as the distance of the second ports from the axis of the stator, said core structure accommodating a plurality of flow passages that connect the top openings to the corresponding bottom openings; (3) the rotor being assembled in the circular cavity of the stator and a plurality of ring structures being sandwiched in-between the lateral exterior surface of the hollow shaft section of the rotor and the interior surface of said circular cavity and being longitudinally spaced apart, two adjacent ring structures forming one circular groove that is in fluid communication with a corresponding first port of the stator and a corresponding top opening of the rotor, the rotor being rotatable about the axis of said circular cavity, the junction between the exterior surface of the bottom end of the rotor and the interior surface of the bottom of the circular cavity of the stator forming a leak-proof contact with an exception of the bottom openings of the rotor which are in fluid communication with the corresponding second ports of the stator when a stepwise rotation of the rotor is properly indexed, each flow passage constantly being fluidly communicated with a corresponding first port, a top opening, and a bottom opening to form a constant flow path that contains the same fluid regardless of rotation, each second port of the stator receiving a different fluid when the second port is switched away from the currently engaged bottom opening to the adjacent bottom opening by a stepwise rotation, simultaneous diversion of multiple fluids being thus realized.

8 Claims, 7 Drawing Sheets

FLOW-DIVERTING ROTARY VALVES OF MULTIPLE PATHS

PRIORITY CLAIM

This application claims benefit of priority of U.S. Provisional Application Ser. No. 60/374,237 filed on Apr. 19, 2002 titled "Flow-Diverting Rotary Valves of Multiple Paths".

FIELD OF THE APPLICATION

The present invention relates to a rotary valve for diverting multiple fluids to different receivers in a sequential and cyclic manner.

BACKGROUND

In a number of fluid delivery processes, a flow passage is required to sequentially receive n fluids one after another from the $1^{st}$ fluid to the $n^{th}$ fluid and to repeat the process endlessly in a progressive and cyclic manner. If multiple flow passages are required to go through the same process simultaneously, as in the case of the simulated moving bed chromatography, the operation is very complex and a special fluid diverting device is needed.

U.S. Pat. No. 3,706,812 describes a rotary valve for this process. The rotary valve comprises three basic parts: a stationary disc, a rotating disc, and a stationary collar ring. The lower face of the stationary disc and the upper face of the rotating disc are in close contact to form a first leak-proof seal and the interior of the stationary collar ring and the exterior of the rotating disc are in close contact to form a second leak-proof seal. The stationary disc has inlet ports on its upper face and circular grooves concentrically spaced apart on its lower face, each inlet port is in communication with one corresponding circular groove. The rotating disc has radial flow passages with inlet openings on the upper face and the outlet openings spacing apart equally on the exterior. The stationary collar ring has outlet ports and each outlet port is in communication with one of the outlet openings of the flow passages of the rotating disc. The inlet openings of the rotating disc locate at different radial distances from the axis of the rotating disc and the radial distances correspond to the radius of the respective circular grooves so that each inlet opening of the rotating disc is always connected with a corresponding circular groove of the stationary disc as the rotating disc rotates. In this way, a fluid will flow in the valve from the same path in the stator and the rotator (from an inlet port, through a concentric groove, an inlet opening, a flow passage, to a outlet opening) but is diverted into different outlet ports of the stationary collar ring. Multiple fluids can be diverted to different outlet ports in a simultaneous, progressive, and cyclic manner by stepwise turning the rotating disc of the rotary valve.

Currently the rotary valve of the prior art is primarily used for fluid-diversion in the applications of low pressure and fewer fluid-paths. For high pressure and more fluid-paths applications, other fluid-diversion means have to be used. This is due to the inherent limitation of the prior art. In the prior art, the circular grooves are concentrically arranged on the lower face of the stationary disc and their number determines the number of flow paths of the rotary valve. The addition of a circular groove to the rotary valve means an exponential increase of the disc size, the rotor-stator contacting area, and the fluid contacting area due to the concentric arrangement of these circular grooves. The increase of the disc size results in a large-sized valve that is inconvenient. The increase of the rotor-stator contacting area means a significant increase of friction that prevents the rotary valve from rotation. The increase of fluid contact area generates a larger force that pushes the stator disc apart from the rotator disc and impairs the seal between the stator disc and the rotator disc when the fluid has a high pressure. All these factors restrict the rotary valve of the prior art to a limited number of flow paths (usually four flow paths) and to the applications of low fluid pressures. Another drawback of the prior art is the relative large volume of the circular grooves and the dramatic volume differences among the circular grooves. These grooves trap the previous fluids and mix them with newly diverted fluids as contaminants by a stepwise rotation. The larger volume in these circular grooves means heavier contamination and the larger volume differences among these grooves means less precision, which should be minimized or avoided.

There is a need to have a new rotary valve for diverting multiple flows in a simultaneous, progressive, and cyclic manner. The rotary valve should be easily sealed and should withstand high pressures. The rotary valve should have minimal volumes in the circular grooves and the volumes of the circular grooves should be similar. The rotary valve should contain more flow paths for complicated applications.

BRIEF DESCRIPTION OF THE PRESENT INVENTION

The present invention describes a rotary valve for simultaneously diverting a plurality of liquid streams among a plurality of liquid receivers in a sequential and cyclic manner. Rather than the prior art that has the circular grooves spacing apart concentrically on the flat surface of the stationary disc, the circular grooves of the present invention locate laterally and are spaced apart longitudinally along a rotating shaft of the rotary valve. The configuration of the present invention has a minimum increase of stator-rotor contacting area and fluid contacting area when an additional circular groove is constructed into the rotary valve, which allows a large number of flow paths and a higher fluid pressure for the rotary valve. The volumes of the circular grooves are minimized and the volume differences among the circular grooves are also eliminated. Said rotary valve comprises:

(1) a stationary stator that has opposing top and bottom ends, a lateral exterior surface, a circular cavity with an lateral interior surface, and a plurality of external ports extending from the lateral exterior surface of the stator to the lateral interior surface of said cavity. Said ports are grouped into group A of n ports and group B of (m*n) ports wherein m and n are integers larger than zero. Ports of group A are designated as ports A and are spaced apart longitudinally from said top end. Ports of group B are designated as ports B, are located approximate to the bottom end on a common plan perpendicular to the axis of said circular cavity, and are equally spaced apart along the circumference of said circular cavity.

(2) a rotor of column shape that has opposing top and bottom ends, a lateral exterior surface, and n internal flow passages F. The rotor is positioned in said circular cavity of the stator rotatable about the axis of said circular cavity. Each of said internal flow passages F has a top opening $C_x$ and a bottom opening $D_x$ on the lateral exterior surface of the rotor wherein x is an integer variable. Openings C are spaced apart longitudinally from said top end of the rotor in such a way that each opening $C_x$ is paired with a corresponding port $A_x$ of the stator on approximate the same plan of the later perpendicular to the axis of said circular cavity. Ring structures are constructed between each neighboring pair of the openings C along the rotor circumference on plans perpendicular to the axis of said circular cavity. Two extra ring structures, one above the first opening $C_1$ and the other below the last opening $C_n$, are similarly constructed. Said ring structures rotatablly seal the interstice between lateral exterior surface of the rotor and the lateral interior surface of said circular cavity of the stator to form n circular flow channels E spaced apart longitudinally. Openings D are located on the same plan as ports B, equally spaced apart along the circumference of the rotor, and aligned with corresponding ports B to form multiple flow paths that extend from ports A, through circular flow channels E, top openings C, internal flow passages F, bottom openings D, to ports B of the stator where receivers are connected. A conventional means for leak-free connection of flow paths between a stationary member and a rotating ember may be adapted to the connection between openings D and ports B that includes but not limits to o-rings, graphite discs, and closely contacting surfaces.

(3) rotating the rotor by 360/(m*n) degrees each time to simultaneously divert multiple fluids from the current receivers to the next receivers. A first fluid entering port $A_1$ of the stator, correspondingly through circular flow channel $E_1$, top opening $C_1$, internal flow passage $F_1$, bottom opening $D_1$, to port $B_1$ of the stator where receiver 1 is connected. Simultaneously, the rest fluids flow through corresponding flow paths of said valve to the corresponding receivers. After rotating the rotor by 360/(m*n) degrees in respect to the stator, said first fluid still enters port $A_1$ of the stator, correspondingly through circular flow channel $E_1$, top opening $C_1$, internal flow passage $F_1$, bottom opening $D_1$, but to port $B_2$ of the stator where receiver 2 is connected. Simultaneously, the rest fluids are diverted to the next corresponding receivers. Said first fluid is diverted back to port $B_1$ again for a new round of fluid diversion after the rotor rotates m*n times to complete a revolution.

DETAILED DESCRIPTION OF THE PREFERRED EMBODIMENTS

For exemplary purpose, all Figures for the preferred embodiments have four flow paths for diverting four fluid streams. It should be realized that the valve of the present invention are able to simultaneously divert more fluid streams and the number of flow paths of the valve is not a limit of the present invention.

Figure 1:
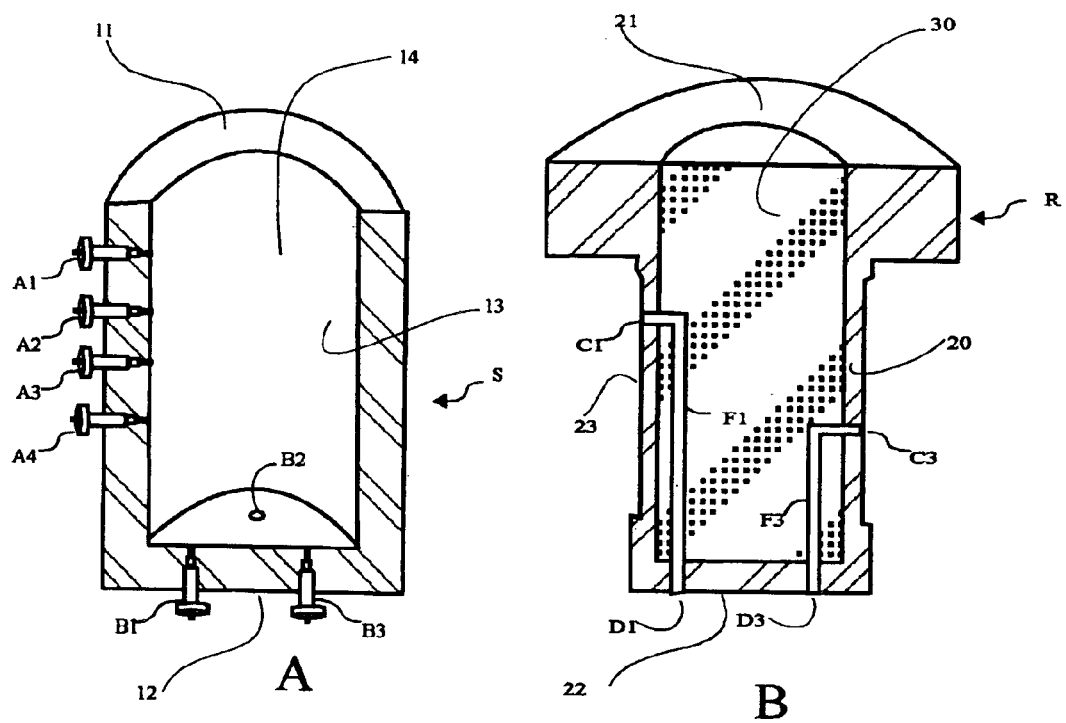
FIG. 1 is a cross-sectional view of the rotor, the stator, and the assembled valve of one embodiment.
Figure 1:
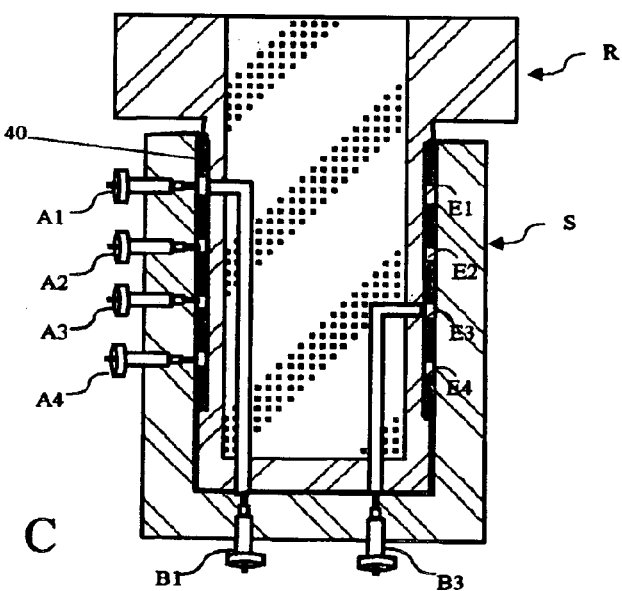

FIG. 1 shows one embodiment of the present invention. The embodiment comprises a stator S and a rotor R that is positioned within stator S. Stator S has a top end 11, a bottom end 12, a lateral exterior surface 13, a circular cavity 14 with an lateral interior surface 14a, and a plurality of external ports extending from lateral exterior surface 13 to the lateral interior surface 14a. Said ports are grouped into group A of 4 ports and group B of 4 ports. The ports of group A are designated as port $A_1$ to $A_4$ and are spaced apart longitudinally from said top end 11. Ports of group B are designated as ports $B_1$ to $B_4$, are located approximate to the bottom end 12 on a common plan perpendicular to the axis of said circular cavity 14, and are equally spaced apart along the circumference of said circular cavity 14. Rotor R is of column shape and has a top end 21, bottom end 22, a lateral exterior surface 23, and four internal flow passages $F_1$ to $F_4$. Rotor R is positioned in circular cavity 14 rotatable about the axis of the circular cavity. Each of said internal flow passages F has a top opening $C_x$ and a bottom opening $D_x$ on the lateral exterior surface 23 of rotor R wherein x is an integer variable. Openings C are spaced apart longitudinally from top end 21 of rotor R in such a way that when rotor R is assembled into stator S each opening C is paired with a corresponding port $A_x$ of stator S on approximate the same plan of the later perpendicular to the axis of said circular cavity 14. A plurality of ring structures 24 extend from lateral exterior surface 23 along the rotor circumference on plans perpendicular to the axis of circular cavity 14 of stator S. Ring structures 24 locate respectively above the first opening $C_1$, below the last opening $C_4$, and between each neighboring pair of the openings $C_1$ to $C_4$. Ring structures 24 rotatablly seal the interstice between the lateral exterior surface 23 of rotor R and the lateral interior surface 14a of circular cavity 14 of stator S to form four circular flow channels $E_1$ to $E_4$ that are spaced apart longitudinally. Openings $D_1$ to $D_4$ of rotor R are located on the same plan as ports B of stator S, equally spaced apart along the circumference of rotor R, and aligned with corresponding ports B to form multiple flow paths that extend from ports A, through circular flow channels E, top openings C, internal flow passages F, bottom openings D, to ports B of the stator wherein receivers are connected. A conventional means for leak-proof connection between a stationary member and a rotating member is preferably adapted to the connections between openings D and ports B that includes but not limits to o-rings, graphite discs, and closely contacting surfaces.

To divert four fluid streams with the valve depicted in FIG. 1, rotor R is turned relative to stator S by 90 degrees each time to simultaneously divert four fluid streams from the current receivers to the next receivers. A first fluid entering port $A_1$ of stator S, correspondingly through circular flow channel $E_1$, top opening $C_1$, internal flow passage $F_1$, bottom opening $D_1$, to port $B_1$ of stator S where receiver 1 is connected. Simultaneously, the remaining three fluid streams flow through corresponding flow paths of said valve to the corresponding receivers. After rotating rotor R by 90 degrees in respect to stator S, port $A_1$ of stator S remains its connection to circular flow channel $E_1$ of rotor R but bottom opening $D_1$ of rotor R is now connected to port $B_2$ of stator S. Said first fluid still enters port $A_1$ of stator S, correspondingly through circular flow channel $E_1$, top opening $C_1$, internal flow passage $F_1$, bottom opening $D_1$, but to port $B_2$ of stator S where receiver 2 is connected. The first fluid is thus diverted from port $B_1$ to port $B_2$. Simultaneously, the rest fluids are diverted to the next corresponding receivers. Said first fluid is diverted back to port $B_1$ again for a new round of fluid diversion after the rotor rotates 4 times to complete a revolution.

The valve may have more ports B than ports A in some application. However, in order to realize a sequential and cyclic fluid diversion among defined receivers, the number of ports B should be a multiple of the number of ports A. The total number of ports A and ports B and the relative numbers between them is not a limit of the present invention.

Figure 2:
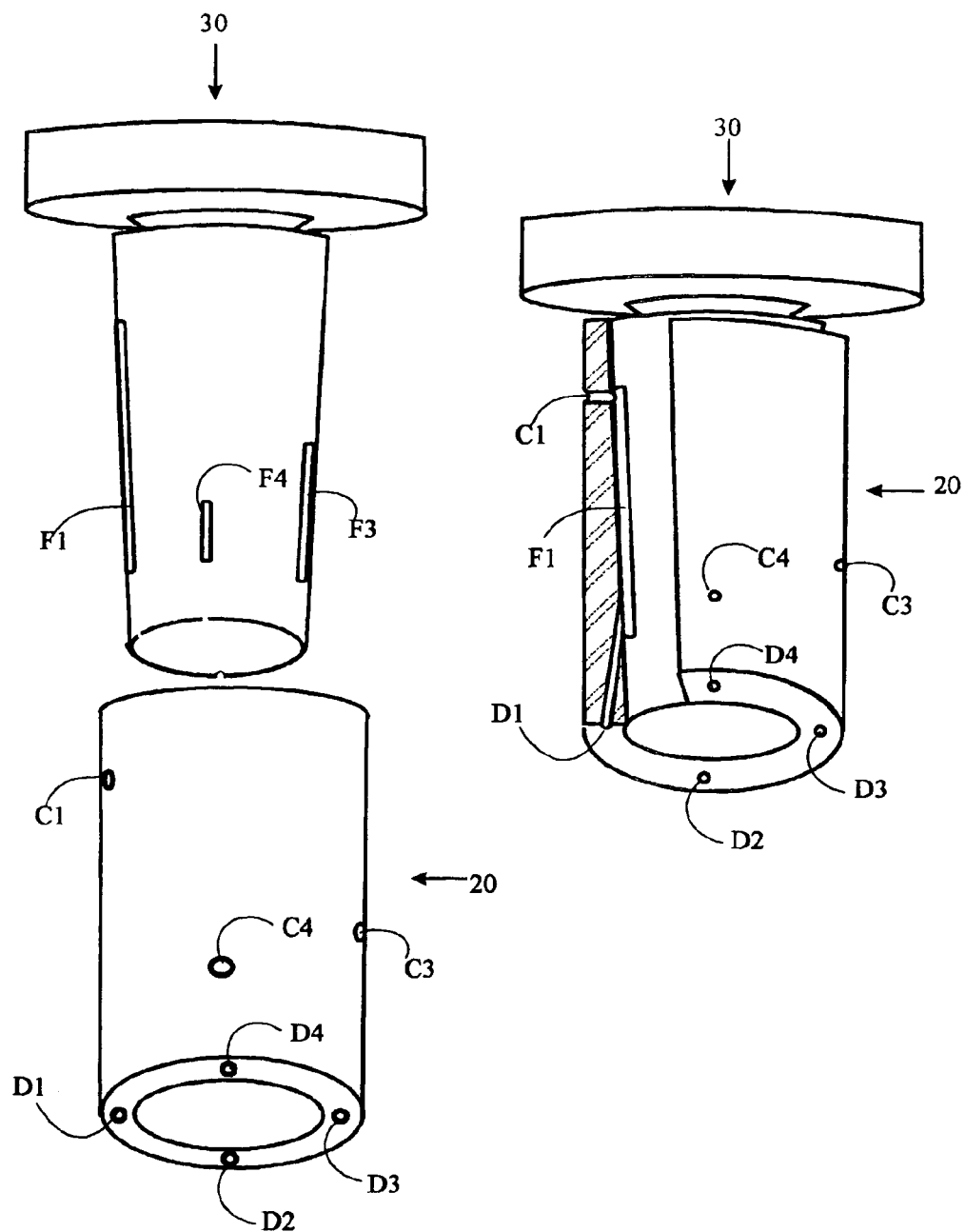
FIG. 2 is a cross-sectional view of the rotor, the stator, and the assembled valve of another embodiment.
Figure 3:
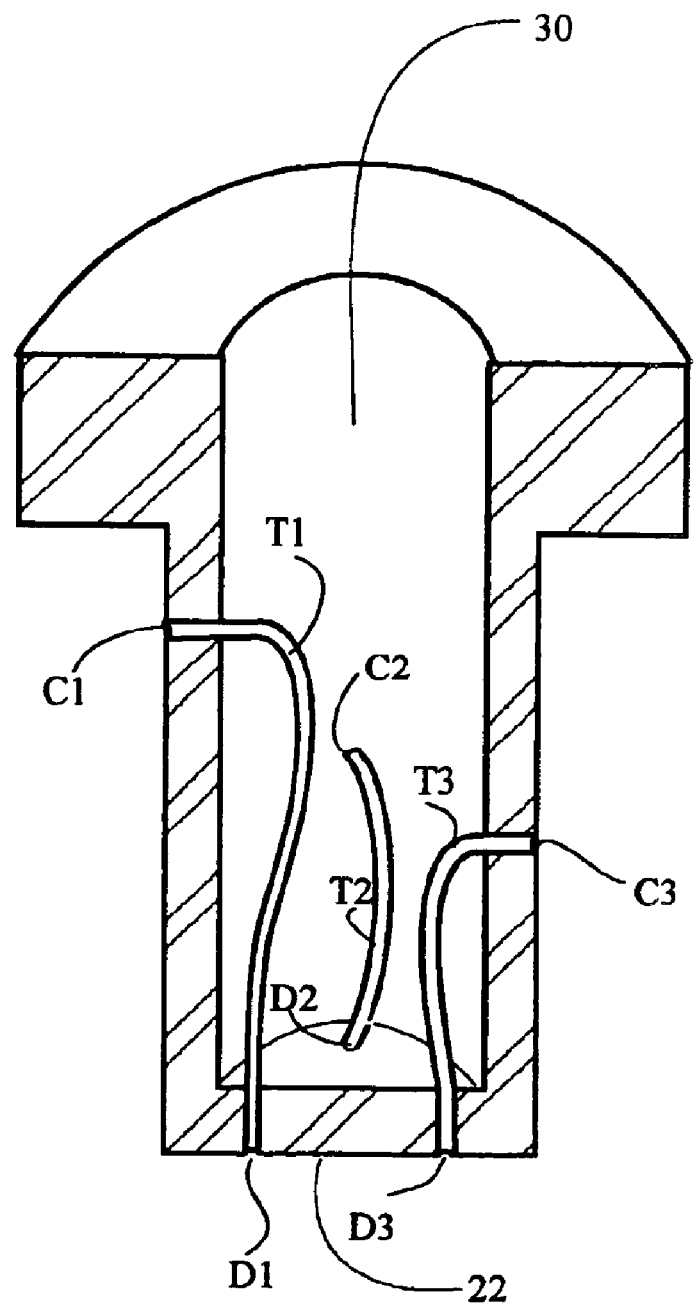
FIG. 3 is a cross-sectional view of the assembled vale of another embodiment.

Ring structures 24 can be formed in different ways. They can be formed by projecting outwardly from the lateral exterior surface 23 of rotor R as shown in FIG. 1. They can also been formed by inward projections from lateral interior surface 14 of stator S as shown in FIG. 2, or by positioning O-rings between stator S and rotor R as shown in FIG. 3. Unlike the embodiment shown in FIG. 1, the ring structures 24 of the embodiment in FIG. 2 are formed by inward projections extending from the lateral interior surface 14a of stator S. The assembled valve in FIG. 2 functions the same as the valve described in FIG. 1 and the elements like those previously described are designated by like numerals.

The embodiment in FIG. 3 has ring structures 24 made of O-rings. These O-rings are preferably secured by grooves along the circumference of the valve. Said grooves can be located on the lateral exterior surface 23 of rotor R as shown in FIG. 3. They can be also located on the lateral interior surface of stator R. The O-rings are preferably made of rubber or plastics for efficient seal between neighboring circular flow channels E.

Figure 4:
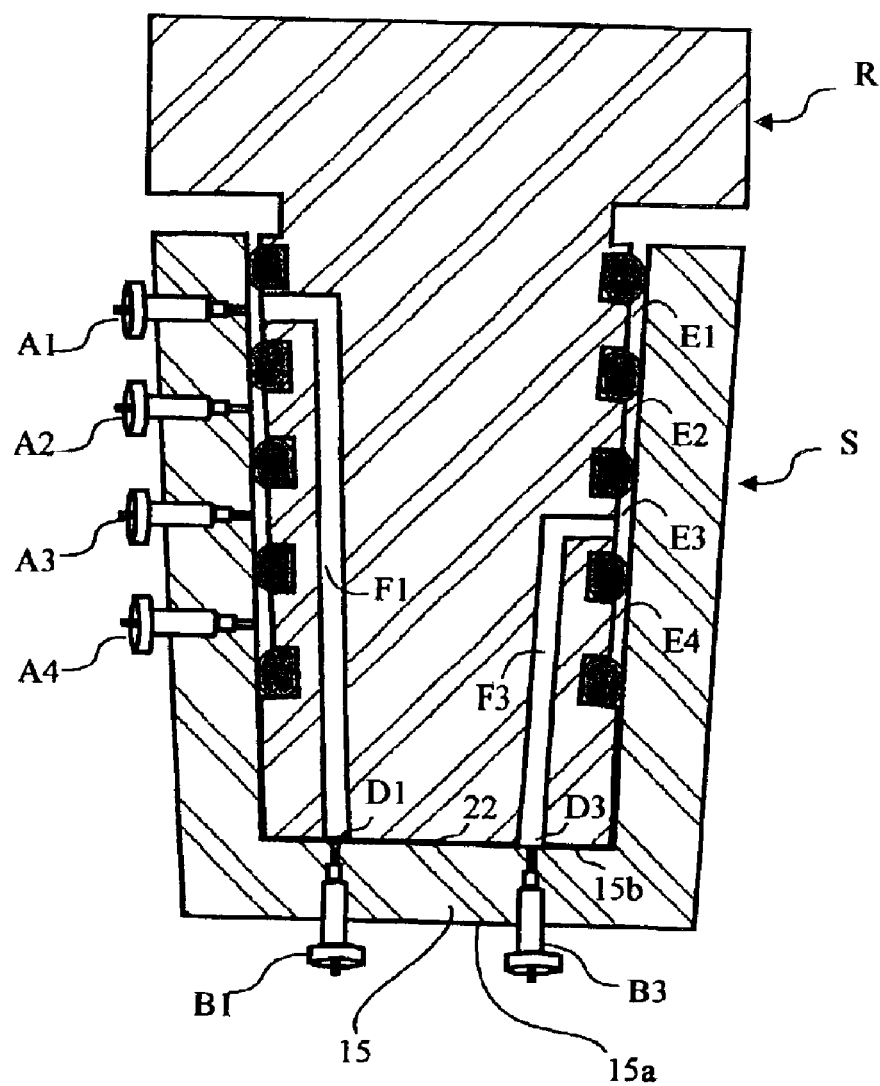
FIG. 4 is a cross-sectional view of the assembled vale of another embodiment.

FIG. 4 shows another modification to the embodiment in FIG. 1. Circular cavity 14 of stator S has a bottom 15 with a bottom exterior surface 15a and a bottom interior surface 15b. Said bottom 15 has four Ports $B_1$ to $B_4$ that extend from said bottom exterior surface 15a to said bottom interior surface 15b. Ports B are equally spaced apart along a circular orbit concentric to said circular cavity 14. Instead of on the lateral exterior surface 23 of rotor R, four openings $D_1$ to $D_4$ are located on the bottom exterior surface of the bottom end 22 of rotor R and equally spaced apart along a circular orbit that is concentric to rotor R and has the same radius as said circular orbit for ports B of stator S. When rotor R is assembled into the circular cavity of stator S, said bottom interior surface 15b of stator S is in close contact with the bottom exterior surface of said bottom end 22 of rotor R to form leak-proof seal, said openings D are aligned with corresponding ports B, and the valve is able to divert fluid streams in a way described for the embodiment in FIG. 1. The rotatable and leak-free connection between a pair of port $B_x$ and port $D_x$ can be realized by any conventional methods mentioned previously.

Figure 5:
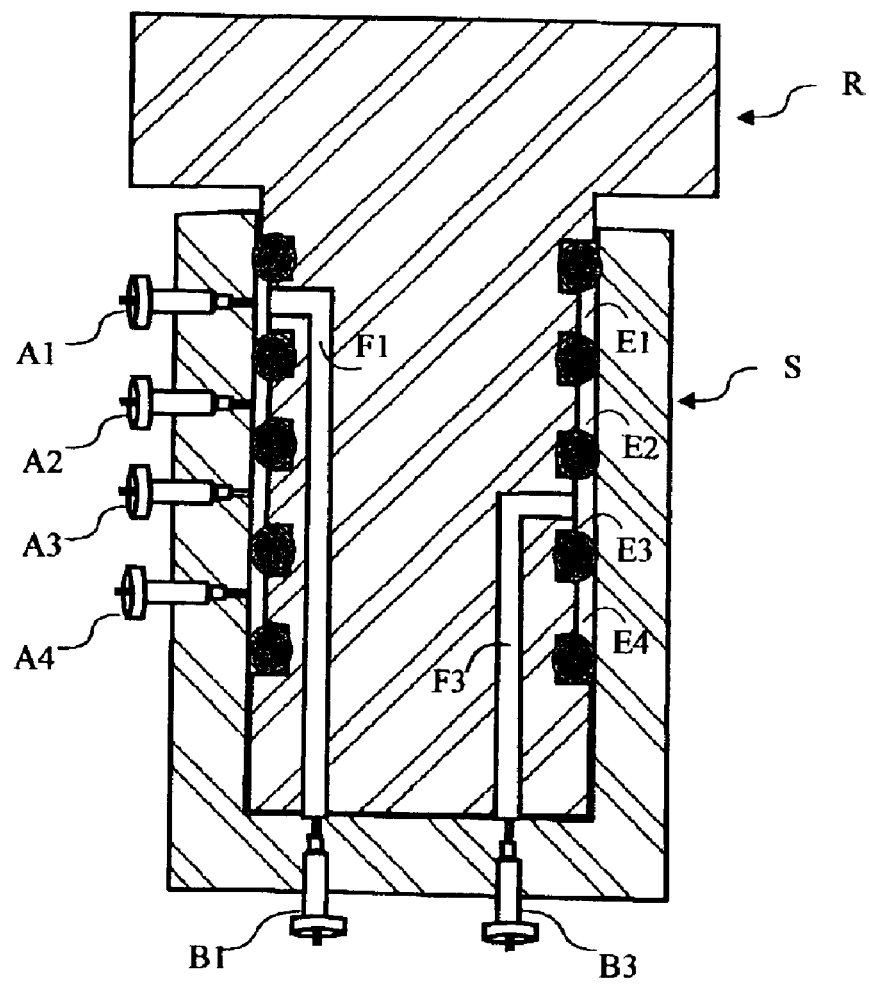
FIG. 5 is a cross-sectional view of the assembled vale of another embodiment.

Though the valves shown in FIG. 1 to FIG. 4 are of truncated conical shape, the valves of the present invention can have other shapes and the geometrical configuration is not the restrict of the present invention. FIG. 5 shows a valve of cylindrical shape modified from the embodiment in FIG. 4. Other configurations, such as conical shape and half-conical/half-cylindrical shape, can also be constructed into the valves of the present invention.

Figure 6:
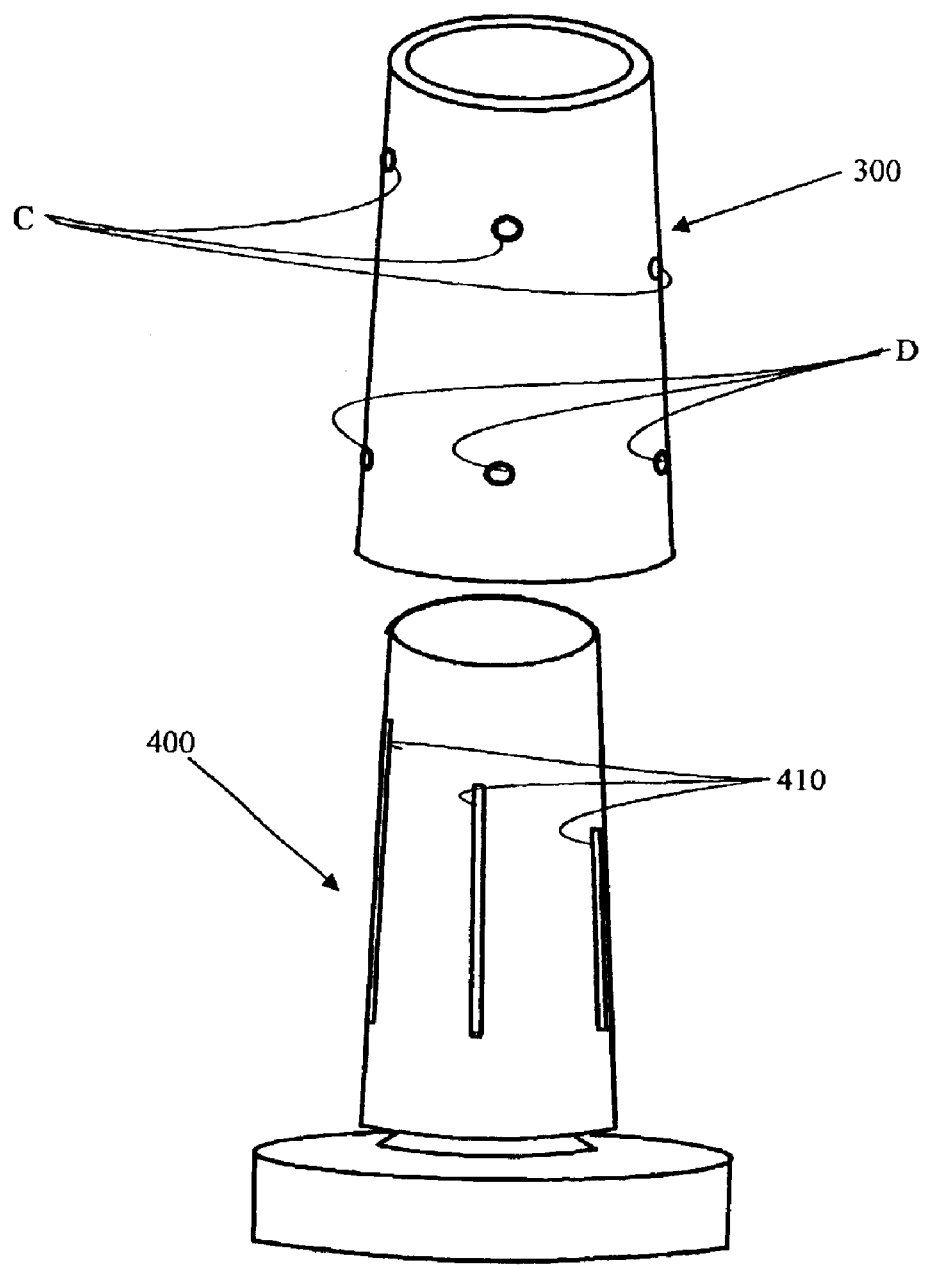
FIG. 6 is a perspective view of a specific rotor and its construction.
Figure 7:
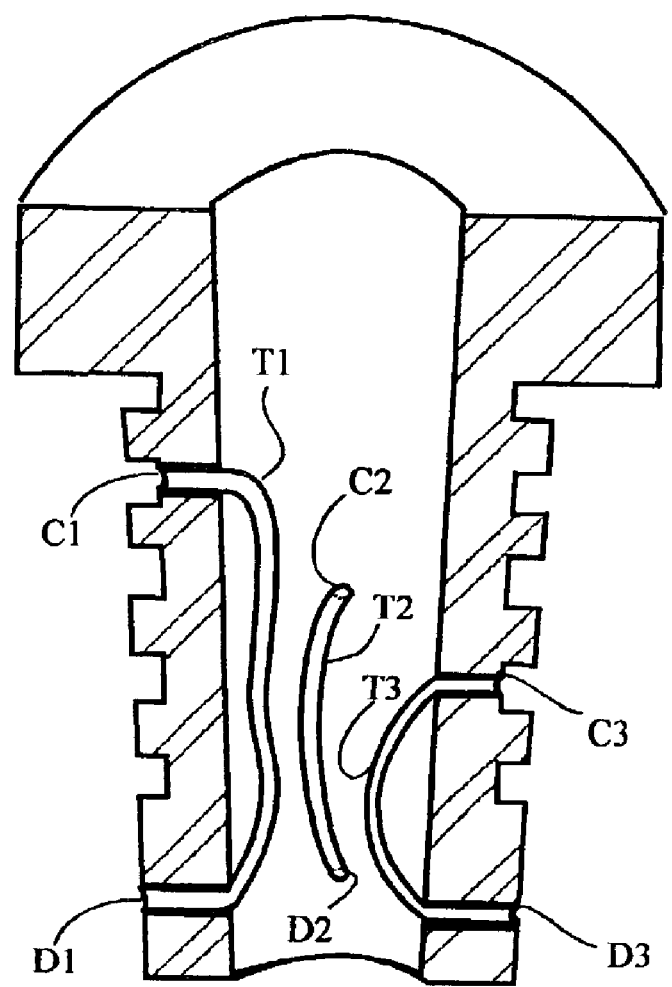
FIG. 7 is a cross-sectional view of another rotor.

The internal flow passages F of rotor R are difficult to construct due to the bends and lengths. FIG. 6 and FIG. 7 described two different approaches to form said internal flow passages. In FIG. 6, the rotor R consists of a hollow tubular structure 300 and a truncated conical column 400 that is positioned within said hollow tubular structure 300. Hollow tubular structure 300 has a cavity of truncated conical shape and has a plurality of ports C and ports D extending from the lateral exterior surface to the lateral interior surface and positioning at the same location as those described in FIG. 1. A plurality of longitudinal slots 410 are carved on the lateral exterior surface of conical column 400 in such a way that each slot connects a port $C_x$ to a corresponding port $D_x$ when column 400 is assembled into hollow tubular structure 300. The tight contact between the lateral interior surface of hollow tubular structure 300 and the lateral exterior surface of column 400 prevents fluid communications among the slots, forming internal flow passages with an opening $C_x$ at one end and an opening $D_x$ at the opposing end. Said slots 410 can also be carved on the lateral interior surface of hollow tubular structure with an opening $C_x$ and an opening $D_x$ at the opposing ends of each slot. In this case the lateral exterior surface of column 400 is preferably smooth for the formation of internal flow passages F.

FIG. 7 shows another approach to construct internal flow passages F. Rotor R has an axially extended cavity and a plurality of openings C and openings D extending from the lateral exterior surface to the lateral interior surface of said cavity. Each opening $C_x$ is connected to a corresponding opening $D_x$ with a tube $T_x$ to form a internal flow passage $F_x$. The leak-proof connection of the tube end to the openings C and D may be realized by any conventional means. It can also be realized by solidifying an appropriate liquid into the cavity. Though the formation of internal flow passages F in FIG. 7 is for the embodiment in FIG. 1, it can apply to the embodiments shown in FIG. 2 and FIG. 3 and other configurations not shown in the Figures but within the scope of the present invention.

Within the principle of FIG. 6 and FIG. 7 is a modification to the location of openings D in rotor R. Instead of on the lateral exterior, said openings D locate on the bottom end of the rotor for the valves shown in FIG. 4 and FIG. 5. Other constructions are the same as the embodiments shown in FIG. 6 and FIG. 7.

What is claimed is:

1. A valve for simultaneously diverting a plurality of liquid streams among a plurality of liquid receivers in a sequential and cyclic manner, said valve comprising:

(1) a stator of barrel shape having a circular cavity, a bottom, a lateral structure, a group of first ports being spaced longitudinally along the lateral structure, and a group of second ports being evenly spaced apart on the bottom around the axis of the stator at the same distance from said axis, the number of the second ports being n multiple of that of the first ports where n is an integer of 1 or larger;

(2) a rotor constructed by a hollow shaft section and a core section within said hollow shaft section, said hollow shaft section having a lateral structure accommodating a plurality of top openings that are longitudinally spaced apart and a bottom end accommodating a plurality of bottom openings that are evenly spaced apart around the axis of the hollow shaft at the same distance from said axis as the distance of the second ports from the axis of the stator, said core structure accommodating a plurality of flow passages that connect the top openings to the corresponding bottom openings;

(3) the rotor being assembled in the circular cavity of the stator and a plurality of ring structures being sandwiched in-between the lateral exterior surface of the hollow shaft section of the rotor and the interior surface of said circular cavity and being longitudinally spaced apart, two adjacent ring structures forming one circular groove that is in fluid communication with a corresponding first port of the stator and a corresponding top opening of the rotor, the rotor being rotatable about the axis of said circular cavity, the junction between the exterior surface of the bottom end of the rotor and the interior surface of the bottom of the circular cavity of the stator forming a leak-proof contact with an exception of the bottom openings of the rotor which are in fluid communication with the corresponding second ports of the stator when a stepwise rotation of the rotor is properly indexed, each flow passage constantly being fluidly communicated with a corresponding first port, a top opening, and a bottom opening to form a constant flow path that contains the same fluid regardless of rotation, each second port of the stator receiving a different fluid when the second port is switched away from the currently engaged bottom opening to the adjacent bottom opening by a stepwise rotation, simultaneous diversion of multiple fluids being thus realized.

2. A valve of claim 1 wherein the flow passages are formed by tubes, each said tube being arranged in the core section of the rotor and being connected in a leak-proof manner between a corresponding top opening and a corresponding bottom opening on the hollow shaft section of the rotor.

3. A valve of claim 2 wherein a solidifiable material is filled in the core section of the rotor and is hardened there for enforcement of the tubes.

4. A valve of claim 1 wherein the core section of the rotor is a circular column with a plurality of longitudinal slots on its lateral exterior surface and the hollow shaft section have a top end, a bottom end, a lateral structure, a plurality of top openings in the lateral structure and a plurality of bottom openings extending from the exterior of said bottom end to the interior of said lateral structure, said circular column being pressed into said hollow shaft section in such a way that each said slot is enclosed by the interior surface of said hollow shaft section to form a leak-free channel that connects a said top opening with a corresponding said bottom opening.

5. A valve of claim 1 wherein the ring structures are formed by projections extending inwardly from the lateral interior surface of the circular cavity of the stator.

6. A valve of claim 1 wherein the ring structures are formed by projections extending outwardly from the lateral exterior surface of the rotor.

7. A valve of claim 1 wherein the ring structures are formed by o-rings, the o-rings being secured in position by any conventional means including circular slots in the lateral interior surface of the cavity of the stator.

8. A valve of claim 1 wherein the ring structures are formed by o-rings, the o-rings being secured in position by any conventional means including circular grooves in the lateral exterior surface of the rotor.

* * * * *